2,801,196

SOLDERING FLUX COMPOSITION AND METHOD OF JOINING ALUMINUM THEREWITH

Richard L. Doerr, Niagara Falls, N. Y., assignor to Olin Mathieson Chemical Corporation, a corporation of Virginia No Drawing. Application April 14, 1953, Serial No. 348,824

11 Claims. (Cl. 148—23)

My invention relates to novel compositions of matter comprising stannous chloride and a pyrazoline hydrohalide and their use in soldering operations, particularly aluminum soldering. This application is a continuation-in-part of my copending application Serial No. 269,907 filed February 4, 1952, now abandoned.

Aluminum soldering has presented great difficulties due to the fact that most metals are cathodic to aluminum so that the resulting solder bond is destroyed in the presence of moisture by electrolytic action. Also the surface of aluminum and aluminum alloys is covered by a film of aluminum oxide which is difficult to remove but which must be removed by fluxing action if a firm metal-to-metal bond is to be secured. The availability of materials that might be useful as fluxes is severely circumscribed by a number of circumstances. First, the melting point of any material or materials selected must be such that the flux melts shortly before the solder melts yet it should decompose or volatilize during the soldering operation. The flux must actively wet the metal surface and thus must possess good capillarity and flow in the liquid state. In chemical nature it must be acidic and yet have reducing capacity and it should not leave residues which are hygroscopic or electrically conducting or which cannot be removed by a post-washing operation. Preferably the decomposition products of the flux materials should be completely volatile in order to minimize or eliminate undesired residues.

I have discovered that pyrazoline hydrohalides have special value as fluxes for aluminum soldering operations as disclosed in my pending application Serial No. 348,823 filed April 14, 1953. I have now found that a composition comprising stannous chloride and a pyrazoline hydrohalide has specific utility as a reaction flux for aluminum soldering operations. In this form, the aluminum oxide film coating the aluminum or aluminum alloy surface is not only removed but the surface is coated with tin which promotes the flow and adherence of the solder. The new compositions are soluble in alcohols, e. g. methyl alcohol, in high proportions and therefore are readily handled in various types of production-line soldering operations as by spraying, dipping or roller brushing.

The pyrazoline hydrohalides useful in the flux compositions of my invention are advantageously obtained by the reaction of an aldehyde or a ketone with hydrazine and hydrogen halide. The compounds may be formed by separately reacting the aldehyde or ketone with hydrazine followed by reaction with the selected hydrogen halide or the compounds may be formed by reacting the aldehyde or ketone with a hydrazine monohydrohalide. Substituted hydrazines and hydrazine hydrohalides may be employed. For example, dimethyl hydrazine, phenyl hydrazine, hydroxy ethyl hydrazine or the hydrohalides thereof may be employed. The useful hydrogen halides include hydrogen fluoride, hydrogen bromide and hydrogen chloride, but I prefer compositions based upon hydrogen chloride. Suitable aldehydes and ketones that may be used to produce the pyrazoline hydrohalides are those containing at least one alpha hydrogen. At least one alpha hydrogen must be present in the carbonyl compound in order to effect ring closure to form the pyrazoline. For best results in application as a flux for aluminum soldering operations the nature of the organic radical should be selected to avoid excessive carbonization during the soldering operation. Thus aldehydes or ketones of good thermal stability provide suitable starting materials in the preparation of useful soldering fluxes.

I have found that pyrazoline hydrohalides prepared from ketones have particular value in the flux compositions of my invention as fluxes in aluminum soldering. The pyrazoline prepared from acetone, i. e. 3,5,5 trimethyl pyrazoline hydrohalide, is particularly advantageous, but pyrazolines prepared from other lower aliphatic ketones such as methyl-ethyl ketone, di-acetone alcohol, di-ethyl ketone and methyl isobutyl ketone are also useful. In addition, methyl vinyl ketone, aldol, mesityl oxide and methyl phenyl ketone can be employed in producing pyrazoline hydrohalides which have value as aluminum soldering fluxes. Among the aldehydes, acetaldehyde, propionaldehyde, butyraldehyde, acrolein and crotonaldehyde may be employed.

In the preparation of the pyrazoline compounds, when saturated carbonyl compounds are used, preferably two moles or more of the aldehyde or ketone may be reacted with one mole of the hydrazine monohydrohalide by admixture at ordinary temperatures or with application of controlled heat. When certain unsaturated aldehydes or ketones, such as acrolein or crotonaldehyde, are used, one mole of the aldehyde or ketone is reacted with one mole of the hydrazine monohydrohalide. In the case of viscous or solid materials, an inert solvent is employed. The product may be recovered in the usual way by crystallization and filtration from the excess aldehyde or ketone or the reaction medium. Alternatively, the aldehyde or ketone may be reacted with hydrazine, either as a solution of the hydrate or in the anhydrous state, and the resulting reaction mixture is further reacted with aqueous or gaseous hydrogen halide. Again the reacting proportions are two moles or more of the saturated aldehyde or ketone, or one mole of the unsaturated, for each mole of hydrazine to be reacted and one mole of the hydrogen halide. The compounds prepared from the aldehyde or ketone, hydrazine and the hydrogen halide are advantageously recrystallized from methanol or other suitable solvent in order to obtain a purified product.

The relative proportions of stannous chloride and the pyrazoline hydrohalide can be varied widely depending upon the nature of the soldering operation. Thus either component may be utilized in proportions ranging from about 10 to about 90 weight percent. In general, however, the use of approximately equal proportions provides the most suitable flux compositions.

The stannous chloride and pyrazoline hydrohalide compositions may be prepared by dry mixing the solids in powdered form. In use, the compositions are dissolved in lower aliphatic monohydric alcohols, e. g. methanol, ethanol, isopropyl alcohol, or isobutyl alcohol, with greatest advantage. Lower aliphatic dihydric alcohols, e. g. ethylene glycol, propylene glycol or butylene glycol, may also be used. The alcohol should be substantially anhydrous since the stannous chloride reacts with aluminum at ordinary temperatures in an aqueous environment. The compositions are more soluble in the lower alcohols, but the lower alcohols are preferred primarily for the reason that organic materials forming carbonaceous residues during the soldering operation are to be avoided. In addition to the alcohols, other organic non-charring dispersing media may be employed, for example, solid carriers such as the Carbowaxes which are a series of solid polymers of ethylene glycol. The concentration of the compositions in the carrier medium may be varied widely according to the nature of the soldering operation. In general, concentrated solutions upwards of 10 percent and preferably 25 to 50 percent concentration are most useful. Other materials may be compounded with the flux mixture, for example, ammonium chloride which serves as a diluent or useful extender.

During the soldering operation the temperature and time should be controlled to prevent excessive charring and formation of difficult-to-remove carbonaceous flux residues. For example, it is advisable to limit the soldering temperature to a maximum of about 420° C., and the soldering time should be limited to a period of about 1 to 2 minutes. The soldering residues are easily removed from the metal by washing with hot water. The method of application as noted before may be by spraying, painting, dipping or other suitable means. During the soldering operation the fluxing materials should not be exposed to a flame since they are combustible. The flux compositions may be applied with advantage to the soldering of aluminum and aluminum alloys, or aluminum and its alloys to copper or brass in conjunction with various solders such as cadmium-zinc, zinc-tin and lead-tin and also to the soldering of other metals such as copper and brass.

By way of specific illustration of the preparation and evaluation of a typical composition, 3,5,5 trimethyl pyrazoline monohydrochloride was prepared by reacting 67 grams of 95 percent anhydrous hydrazine by slow addition to 232 grams of acetone in a 500 cc. flask equipped with a reflux condenser. Considerable heat was evolved so that the solution refluxed. One mole of the resulting acetone azine intermediate was admixed with 1 mole of aqueous hydrochloric acid and the resulting 3,5,5 trimethyl pyrazoline hydrochloride was recrystallized from methanol. A composition according to my invention then was prepared by dissolving 5 grams of stannous chloride and 5 grams of the 3,5,5 trimethyl pyrazoline monohydrochloride in 20 cc. of absolute methanol. A clear, water-white, non-viscous solution resulted which was tested for fluxing capacity by placing a small amount together with ½ gram of solder on a square of aluminum sheeting (0.005 inch). The aluminum sheeting was heated to a soldering temperature of 390° to 420° C. by heating on a hot plate. Fluxing capacity was observed visually in terms of spread action, rate of soldering, strength of the resulting solder bond and amount and nature of soldering residues. The flux composition was tested with zinc-cadmium (60–40) and lead-tin (50–50) solders. In each case, excellent fluxing capacity was observed. The minor amounts of residues were readily removed by hot-water washing.

I claim:

1. A soldering flux composition consisting essentially of about 10 to 90 weight percent of stannous chloride and about 10 to 90 weight percent of a pyrazoline hydrohalide in which the pyrazoline is selected from the group consisting of pyrazoline and pyrazolines substituted with at least one substituent selected from the group consisting of lower alkyl substituents containing not more than 4 carbon atoms and phenyl substituents.

2. The composition of claim 1 in which the pyrazoline hydrohalide is 3,5,5-trimethyl pyrazoline monohydrochloride.

3. The composition of claim 1 in which the pyrazoline hydrohalide is 3,5,5-trimethyl pyrazoline monohydrobromide.

4. The composition of claim 1 in a substantially anhydrous carrier selected from the group consisting of lower aliphatic monohydric alcohols and lower aliphatic dihydric alcohols, said alcohols containing not more than 4 carbon atoms.

5. The composition of claim 4 in which the pyrazoline hydrohalide is 3,5,5-trimethyl pyrazolines monohydrochloride and the carrier is methanol.

6. The composition of claim 4 in which the pyrazoline hydrohalide is 3,5,5-trimethyl pyrazoline monohydrobromide and the carrier is methanol.

7. In the joining of aluminum, aluminum alloy, copper and brass metals by solder wherein a flux is used, the step of applying to the said metals to be joined as a flux a composition consisting essentially of about 10 to 90 weight percent of stannous chloride and about 10 to 90 weight percent of a pyrazoline hydrohalide, in which the pyrazoline is selected from the group consisting of pyrazoline and pyrazolines substituted with at least one substituent selected from the group consisting of lower alkyl substituents containing not more than 4 carbon atoms and phenyl substituents, in a substantially anhydrous carrier selected from the group consisting of lower aliphatic monohydric and lower aliphatic dihydric alcohols containing not more than 4 carbon atoms.

8. The method of claim 7 in which the pyrazoline hydrohalide is 3,5,5-trimethyl pyrazoline monohydrochloride.

9. The method of claim 7 in which the pyrazoline hydrohalide is 3,5,5-trimethyl pyrazoline monohydrobromide.

10. The method of claim 7 in which the pyrazoline hydrohalide is 3,5,5-trimethyl pyrazoline monohydrochloride and the carrier is methanol.

11. The method of claim 7 in which the pyrazoline hydrohalide is 3,5,5-trimethyl pyrazoline monohydrobromide and the carrier is methanol.

References Cited in the file of this patent

UNITED STATES PATENTS

| | | |
|---|---|---|
| 1,293,823 | Luckey | Feb. 11, 1919 |
| 1,811,667 | Gravell | June 23, 1931 |
| 2,155,307 | Hagemann | Apr. 18, 1939 |
| 2,172,979 | Kohler et al. | Sept. 12, 1939 |

OTHER REFERENCES

Iron Age, Dec. 30, 1948, page 33 relied on.